Patented Feb. 7, 1950

2,496,278

UNITED STATES PATENT OFFICE 2,496,278

PROCESS OF DRYING FRUIT OR VEGETABLE MATERIALS CONTAINING ADDED METHYL CELLULOSE

Clyde W. Eddy, Berkeley, Calif., assignor to the United States of America as represented by the Secretary of Agriculture No Drawing. Application May 18, 1944, Serial No. 536,227

6 Claims. (Cl. 99—206)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to drying aids and antihydroscopic agents, and has among its objects the provision of a new drying aid for use in the spray or drum drying of fruit and vegetable juices, concentrates, pulps, purees, and the like.

In contrast with milk and eggs, fruits and vegetables present considerably more difficulty in the production of free-flowing powders by spray or drum-drying methods because of the naturally occurring sugars, acids, and so forth, which produce products that are relatively hygroscopic. I have found that this difficulty can be substantially eliminated by the use of methyl cellulose as a drying aid.

The use of methyl cellulose for this purpose is illustrated by the following examples:

Example I

*Grapefruit spray-dried powder.*—Grapefruit juice of 10.4° Brix is concentrated in vacuo to 30° Brix. With this concentrate methyl cellulose (4000 cps.) is incorporated in a concentration of 1 percent of the fruit solids present, by dissolving with rapid beating the necessary amount of methyl cellulose in about 20 percent of the concentrate and adding the remainder to the mixture. Spray drying of the mixture gives a free-flowing powder.

Methyl cellulose may also be dissolved in about 20 to 50 times its weight of cool water with rapid beating and the resultant solution incorporated into the fruit or vegetable juice or puree.

Example II

*Orange juice spray-dried powder.*—To 2800 g. of strained orange juice containing 11.1 percent solids is added 3.11 g. methyl cellulose (4000 cps.) by rapid beating until dissolved. The resulting mixture when spray dried gives a relatively free-flowing powder.

Example III

*Orange-grapefruit pulp spray-dried powder.*—To 2950 g. of orange pulp (8 parts) and grapefruit pulp (2 parts) prepared by disintegration of the whole fruit and flash pasteurization of the mixed pulps, was added with rapid stirring a solution of 1.6 g. of methyl cellulose (4000 cps.) in 200 g. of water. The resultant mixture was spray dried to produce a relatively free-flowing powder.

The concentrates of methyl cellulose added may vary from 0.1 percent to 4.0 percent of the solids present in the fruit or vegetable material to be processed. The quantity needed in a particular instance will depend on the product to be dried. Fruits, for example, may require a higher concentration than vegetables to produce a satisfactory free-flowing powder. Methyl cellulose having viscosities ranging from 15 to 4,000 cps. may be used.

Although the present invention has been illustrated by its application to citrus fruits, it is applicable generally to other fruit and vegetable juices, concentrates, pulps, purees, and so forth, or combinations of these in various proportions. The invention is also applicable to the production of free-flowing powders, flakes, or granules by either spray or drum-drying methods.

Having thus described my invention, I claim:

1. In the process of preparing free-flowing powders, flakes, and granules by drying fruit and vegetable juices, concentrates, pulps, purees, the step which comprises adding methyl cellulose as a drying aid to the material to be processed and then drying the combined methyl cellulose and material.

2. In the process of preparing free-flowing powders, flakes, and granules by drying fruit and vegetable juices, concentrates, pulps, purees, the step which comprises adding methyl cellulose having a viscosity within the range from 15 to 4,000 cps. to the material to be processed in a concentration of from 0.1 to 4.0 percent of the solids and then drying the combined methyl cellulose and material.

3. In the process of preparing free-flowing powders, flakes, and granules by drying citrus fruit juices, concentrates, pulps, purees, the step which comprises adding methyl cellulose having a viscosity within the range from 15 to 4,000 cps. to the citrus fruit material to be processed in a concentration of from 0.1 to 4.0 percent of the citrus fruit solids and then drying the combined methyl cellulose and material.

4. A method for preparing a free-flowing dried fruit which comprises spray drying a fruit juice containing methyl cellulose.

5. A method for preparing a free-flowing dried fruit which comprises spray drying a fruit juice containing 0.1 percent to 4.0 percent of methyl cellulose based on the solids present in the juice.

6. A method for preparing a free-flowing dried fruit which comprises spray drying a fruit juice containing 0.1 percent to 4.0 percent of methyl cellulose based on the solids present in the juice, said methyl cellulose having a viscosity within the range from 15 to 4,000 cps.

CLYDE W. EDDY.

REFERENCES CITED

The following references are of record in the file of this patent:

UNITED STATES PATENTS

| Number | Name | Date |
|---|---|---|
| Re. 14,633 | Kern | Apr. 15, 1919 |
| 1,204,881 | Kern | Nov. 14, 1916 |
| 1,481,893 | Fleming | Jan. 29, 1924 |
| 1,844,707 | Washburn | Feb. 9, 1932 |
| 1,975,998 | Wilson | Oct. 9, 1934 |
| 2,302,511 | Wallach | Nov. 17, 1942 |
| 2,393,561 | Perech | Jan. 22, 1946 |

OTHER REFERENCES

"The Ethers of Cellulose," Journal of the Society of Chemical Industry, 1934, by D. Traill.

"Water-Soluble Cellulose Ethers," Industrial and Engineering Chemistry, Sept. 1937, by L. H. Bock.